UNITED STATES PATENT OFFICE.

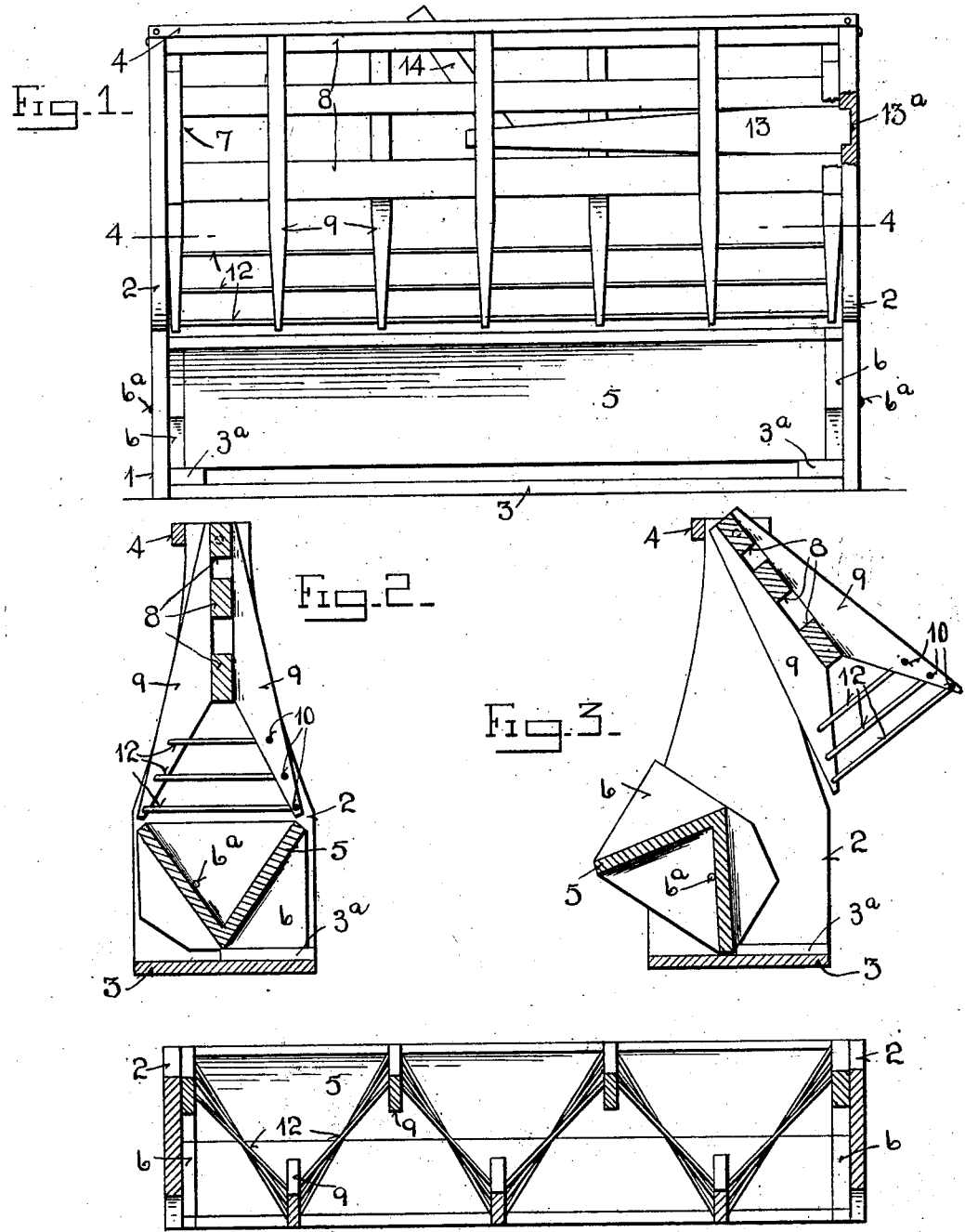

JOSEPH C. WAGNER, OF EASTON, MISSOURI.

FEED-TROUGH.

No. 861,922.   Specification of Letters Patent.   Patented July 30, 1907.

Application filed September 13, 1906. Serial No. 334,539.

*To all whom it may concern:*

Be it known that I, JOSEPH C. WAGNER, a citizen of the United States, residing at Easton, in the county of Buchanan and State of Missouri, have invented certain new and useful Improvements in Feed-Troughs; and I do declare the following to be a full, clear, and exact description of the invention, such as will enable others skilled in the art to which it appertains to make and use the same.

This invention relates to improvements in feed troughs.

The object of the invention is to provide a feed trough having means whereby the heads of the animals feeding therefrom will be separated and the animals be prevented from getting into the trough, means also being provided whereby the trough may be dumped for cleaning.

With the foregoing and other objects in view, the invention consists in the novel features of construction, combination, and arrangement of devices, hereinafter described and claimed.

In the accompanying drawings,—Figure 1 is a side view of a feed trough constructed in accordance with the invention, parts being shown in section; Fig. 2 is a vertical cross sectional view of the same; Fig. 3 is a similar view showing the rack swung back and the trough turned downwardly; and Fig. 4 is a horizontal sectional view on the line 4—4 of Fig. 1.

Referring more particularly to the drawings, 1 denotes the supporting frame comprising end pieces or standards 2, which are connected together at their lower ends by a base board 3 and at their upper ends by a cross bar 4 and stops 3ª are secured to said base board adjacent said end pieces. Between the end pieces 2 of the frame is arranged a trough 5, which is preferably V-shaped in cross section and closed at its opposite ends by end pieces 6, having one corner cut away and which are pivotally connected at 6ª to the end pieces or standards 2 of the frame, whereby the trough may be swung over or upset, as shown in Fig. 3 of the drawing, to clean the same and when in upright position said end members 6 engage the stops 3ª which prevent them from tilting in the opposite direction.

Pivotally mounted between the upper ends of the end pieces of the frame is a rack 7, which consists of a series of longitudinally-disposed parallel bars 8, to the opposite sides of which are connected the upper ends of substantially triangular spacing bars 9, the lower ends of which project downwardly and outwardly over the trough 5 and terminate adjacent to the upper edges of the same, when the parts are in position for use, as clearly shown in Fig. 2 of the drawing. The spacing bars 9 on one side of the longitudinal bars 8 are arranged midway between the spacing bars 9 on the opposite side thereof. The outwardly and downwardly projecting ends of the bars 9 have formed therein a series of apertures 10, through which are arranged a series of wires 12, said wires being laced back and forth from the bars 9 on one side of the trough to the bars on the opposite side thereof, thus providing a series of triangularly-shaped feeding spaces between the lower ends of the spacing bars 9 over the trough, which are sufficiently large to permit the animals to feed, but which will prevent them from getting into the trough.

In order to hold the rack in an operative position over the trough, a locking device is provided, said device being here shown as consisting of a locking bar or bolt 13, which is slidably mounted between the bars 8 of the rack, and is adapted to be engaged with a recess 13ª in one of the end pieces 2 of the frame. The bar or bolt 13 is operated by a lever 14, which is pivotally connected thereto and to the bars 8 of the rack, as shown, whereby when the lever is swung in one direction, the bar or bolt 13 will be projected into engagement with the recess in the end piece 2, and when the lever is swung in the opposite direction, the bar or bolt 13 will be disengaged from the recess in the end pieces to allow the rack to be swung to one side to permit the trough to be tipped over for cleaning, as shown in Fig. 3, it being seen by reference to Fig. 2 that the bars 9 would prevent the tilting of the trough were the rack not pivotally mounted and swung out of the way when it is desired to tilt the trough.

From the foregoing description, taken in connection with the accompanying drawings, the construction and operation of the invention will be readily understood without requiring a more extended explanation.

Having thus described my invention, what I claim as new and desire to secure by Letters-Patent, is,—

1. A device of the class described comprising a supporting frame, a feed trough pivoted eccentrically in said frame, a rack pivoted to swing above the trough and operating normally to prevent said trough from tilting, said rack comprising longitudinally-disposed supporting bars, approximately triangular-shaped spacing bars secured at one end to the supporting bars and extended downwardly and outwardly therefrom over the opposite sides of the trough, the spacing bars on one side of the rack being staggered in relation to those on the other side thereof, a plurality of spacing wires secured to the spacing bars at the opposite sides of the trough to form zig-zag feed openings, means for holding the rack in operative position, and means for operating said holding means.

2. In a feed device, the combination with a supporting base, end members secured thereto, a cross bar connecting said end members, a stop secured to said supporting base adjacent to one face of one of said end members at one side thereof, of a pivotally-mounted feed trough having means for engaging said stop for holding said trough against tilting in one direction and for limiting the turning thereof in the other direction, a rack pivoted above said trough in position to normally hold it against tilting in either direction, and means for holding said rack in operative position.

In testimony whereof I have hereunto set my hand in presence of two subscribing witnesses.

JOSEPH C. WAGNER.

Witnesses:
    J. W. MAYS,
    J. C. FRICK.